(12) United States Patent
Kramer

(10) Patent No.: US 7,513,373 B2
(45) Date of Patent: Apr. 7, 2009

(54) FILTER ELEMENT AND LIQUID FILTER FOR FREEZE-ENDANGERED LIQUIDS AND METHOD FOR PRODUCING SUCH A FILTER ELEMENT

(75) Inventor: Joerg Kramer, Hechingen (DE)

(73) Assignee: Mann & Hummel GmbH, Ludgwigsburg (DE)

( * ) Notice: Subject to any disclaimer, the term of this patent is extended or adjusted under 35 U.S.C. 154(b) by 379 days.

(21) Appl. No.: 11/122,043

(22) Filed: May 5, 2005

(65) Prior Publication Data
US 2005/0263451 A1 Dec. 1, 2005

(30) Foreign Application Priority Data
May 5, 2004 (DE) .................. 10 2004 025 811

(51) Int. Cl.
*B01D 35/30* (2006.01)
*B01D 27/00* (2006.01)
(52) U.S. Cl. .................. 210/440; 210/435; 210/450; 210/455
(58) Field of Classification Search .................. 210/450, 210/452, 451, 445
See application file for complete search history.

(56) References Cited
U.S. PATENT DOCUMENTS 5,211,846 A  5/1993  Kott et al.
6,139,738 A * 10/2000 Maxwell ................ 210/248
6,554,139 B1 * 4/2003 Maxwell et al. ........ 210/435
6,558,536 B2 * 5/2003 Jainek et al. ........... 210/184
6,569,326 B1 * 5/2003 Baumann et al. ....... 210/232
6,679,990 B2 * 1/2004 Reinhart ................ 210/232
7,296,689 B2 * 11/2007 Klotz et al. ............. 210/435
2003/0209484 A1 11/2003 Klotz et al.

FOREIGN PATENT DOCUMENTS

DE  4419361  12/1995
DE  102 20 662  11/2003

OTHER PUBLICATIONS

German Search Report dated Jan. 18, 2006.

* cited by examiner

*Primary Examiner*—Krishnan S Menon
*Assistant Examiner*—Madeline Gonzalez
(74) *Attorney, Agent, or Firm*—Crowell & Moring LLP

(57) ABSTRACT

A filter element (10) suitable for installation in a liquid filter for cleaning a freeze-endangered liquid; the liquid filter having a housing (37), composed of a housing pot (38), a housing cover (39), and a filter element (10) situated in the housing pot (38), with the housing cover (39) screwed onto the housing pot (38) in a sealed manner. The filter element (10) has a first end disk (11); a second end disk (12), and a filter medium (13) interposed between the end disks (11, 12). The end disks (11, 12) are mutually connected by a supporting element (30), which prevents radial relative movements between the end disks (11, 12). In the axial direction, the supporting element (30) has snap hooks (25) which connect the first end disk (11) undetachably to the second end disk (12). As a result of this connection, the second end disk (12) can be reliably removed from the housing pot (38) by pulling on the first end disk (11).

11 Claims, 3 Drawing Sheets

FILTER ELEMENT AND LIQUID FILTER FOR FREEZE-ENDANGERED LIQUIDS AND METHOD FOR PRODUCING SUCH A FILTER ELEMENT

BACKGROUND OF THE INVENTION

This invention relates to a filter element for filtering a freeze-endangered liquid, such as a urea-water solution; to a liquid filter for filtering freeze-endangered liquids comprising a housing with an inlet and an outlet and containing a filter element according to the invention, and to a method for producing such a filter element.

Published U.S. Patent Application No. US 2003/0209484 A1 describes a liquid filter for freeze-endangered liquids. The liquid filter has a housing which is closable by a filter cover. In the housing there is a filter element having a filter medium and end disks. Each end disk is attached to the filter medium by adhesive film. In addition, the end disks are joined together by a filler piece. The filler piece is therefore integrally molded onto a first end disk. On the end face opposite the end disk, the filler piece has a toothed area. The toothed area engages in an area located on the second end disk. Due to the intermeshing areas, torsional forces can be transferred from one end disk to the other end disk. In dismantling the filter element, the force of removal is transferred from the first end disk to the second end disk through the filter medium. This may cause the filter medium to tear, so the lower end disk is not removed from the housing. This requires additional assembly effort to extract the lower end disk from the housing.

SUMMARY OF THE INVENTION

It is an object of the present invention to provide an improved liquid filter and filter insert for freeze-endangered liquids.

Another object of this invention is to provide a liquid filter and a filter element therefor in which the filter element can be replaced easily and rapidly.

An additional object is to provide a method for producing a filter insert for a liquid filter according to the invention in a relatively easy and comparatively inexpensive manner.

These and other objects are achieved in accordance with the present invention by providing a filter element for filtering a freeze-endangered liquid comprising first and second end disks; a filter medium situated with a seal between the end disks, the filter medium being closed in the form of a ring and surrounding an annular space, and a supporting element which is slightly smaller than the annular space and which is situated inside the annular space, the supporting element being connected to the second end disk and having an anti-rotation element which engages in a receptacle area on the first end disk, wherein the supporting element is provided with an axial lock which is operatively connected to the first end disk.

In accordance with a further aspect of the invention, the objects are achieved by providing a liquid filter for a freeze-endangered liquid, the filter comprising a filter element as described above and a housing with an inlet and an outlet; the housing comprising a housing pot and a housing cover, the housing pot having an inside volume which is slightly larger than the filter element, and the filter element being disposed in the housing such that the inlet is separated from the outlet by a seal.

In accordance with yet another aspect of the invention, the objects are also achieved by providing a method comprising the steps of attaching the second end disk to the filter medium; securing the anti-rotation element of the supporting element in the first end disk; attaching the first end disk to the filter medium, and connecting the axial lock of the supporting element to the first end disk.

The filter element according to the invention is used for cleaning a freeze-endangered liquid which expands upon freezing at least occasionally. One example of such a liquid is a urea-water solution of the type used for exhaust gas treatment in a motor vehicle. Freeze-endangered liquids are liquids such as water which have a freezing point higher than the lowest ambient temperatures. Many liquids have the property of expanding during the transition from a liquid to a solid state and thus at least occasionally assuming a larger volume than in the liquid state. This expansion can damage components filled with such a liquid. The filter element has at least a first end disk and a second end disk with a filter medium arranged and sealed between the end disks. The filter medium is a paper or non-woven web suitable for separating impurities from the liquid to be cleaned. Of course all the filter media with which those skilled in the art are familiar and which are suitable for cleaning the flow of liquid may be used. The filter medium is closed in the form of a ring, in particular a circular ring. Filter media closed in the form of a ring are understood to include, for example, filter media closed in an oval or polygonal shape, in which the ends are connected to the beginnings. The filter medium thus borders an annular space in which a supporting element is arranged. The supporting element is slightly smaller than the annular space, so a gap remains between the filter medium and the supporting element. The supporting element is largely impermeable for the liquid to be cleaned, so that the volume taken up by the supporting element cannot be filled by the liquid. The small quantity of liquid thus cannot expand as greatly as it would otherwise, so that damage to the filter parts is prevented. The supporting element is fixedly connected to the second end disk so that relative movements between the second end disk and the supporting element are prevented. The supporting element has an anti-rotation element which engages in a receptacle area on the first end disk. Due to the anti-rotation element, torsional forces from the first end disk are transferred directly via the supporting element to the second end disk without exposing the filter medium to the torsional force. In addition, the supporting element has an axial lock which is connected operatively to the first end disk. The axial lock is a connection between the first end disk and the supporting element by means of which axial forces are transferred from the first end disk to the second end disk. Such axial forces occur, for example, when changing the filter element, when the filter element is removed from the housing. When the filter element is exposed to the liquid to be cleaned, there may be a loss of stability of the filter medium. When axial forces act on an unstable filter medium, it may result in tearing of the filter medium, so that a portion of the filter medium remains on the first end disk and the remainder of the filter medium remains on the second end disk. Due to the axial lock, even when the filter medium is damaged, the force is still transferred from the first end disk to the second end disk, thereby ensuring reliable removal of the complete filter element from the housing. The axial lock may be designed so that the first end disk is arranged without play in relation to the supporting element, so that axial movements of the first end disk lead to direct movements of the second end disk. In other embodiments, the first end disk may execute relative axial movements in relation to the supporting element without the second end disk being moved directly with it. In these embodiments, the axial movements of the first end disk are first transferred via the filter medium. If the filter medium cannot transmit any axial forces because it is damaged or unstable, the axial lock will move the second end disk when a defined axial path has been traveled.

In accordance with one advantageous embodiment of this invention, the axial lock is a snap connection to which the supporting element and the first end disk are connected. The snap connection has at least one snap element which engages elastically in the first end disk when assembled. The snap connection is easy to manufacture, in particular by injection molding of plastic. In assembly, the snap connection is simply pressed into the first end disk and is hooked in place, thus forming the axial lock.

In another advantageous embodiment of the present invention, the supporting element has two parts inseparably joined together with a seal, the axial lock being situated on one of the parts. The inseparable connection may be produced, e.g., by gluing or welding, in particular by spin welding. By dividing the supporting element into two parts, simple geometries can be implemented in the manufacture of the individual parts, so that by joining these parts together, they have the required geometry of the supporting element. Simple molds are therefore sufficient for injection-molded plastic parts, so the manufacturing costs are low.

In a preferred embodiment of this invention, the supporting element has a liquid-tight area and a liquid-permeable area. The liquid-tight area is separated from the liquid-permeable area by a seal. Thus the liquid-permeable area may connect the clean side situated in the annular space of the filter element to an outlet situated in the housing so that only a small quantity of liquid is present in the annular space of the filter element. The small quantity of liquid cannot expand as greatly when frozen and cause damage to the filter element or the parts surrounding the filter element.

According to a further advantageous embodiment of this invention, the liquid-permeable area is at least partially situated in the anti-rotation element. The anti-rotation element here has openings and webs, where the webs form the anti-rotation element and the openings are permeable for the liquid. In this further embodiment, multiple functions are combined in one part so that the other parts can have a simpler geometry and no additional space is necessary for function components.

It is advantageous if the first end disk has a profiled peripheral area with elevations and recesses. Thus the first end disk may be supported on the inside of a housing. Despite the fact that the filter element with the elevations is supported on the inside of the housing, a volume flow can flow between the recesses on the first end disk and the housing and can flow uniformly toward the filter element.

According to an advantageous embodiment of this invention, at least a part of the supporting element is integrally molded on the second end disk. This makes it possible to eliminate one operation for joining the second end disk to the supporting element.

The liquid filter according to the invention for freeze-endangered liquids, in particular for urea-water solutions, comprises a filter element and a housing having an inlet and outlet, the housing having a housing pot and a housing cover. The housing pot has an inside volume (V) which is slightly larger than the filter element. The filter element is inserted into the housing in such a way that the inlet is separated from the outlet by a seal, so that the filter element is constructed in accordance with the features described above.

In the method according to the invention for manufacturing a filter element as described above, the second end disk is connected with a seal to the filter medium which is closed in a ring or annular shape. This connection can be produced by gluing or welding, in particular by butt-welding. Then the anti-rotation element of the supporting element is secured in the first end disk, so that the end disks are brought into position in relation to one another and thus can no longer twist. The axial lock is formed between the supporting element and the first end disk. Then the first end disk is connected to the filter medium.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments depicted in the accompanying drawing figures, in which.

DETAILED DESCRIPTION OF PREFERRED EMBODIMENTS

Figure 1:
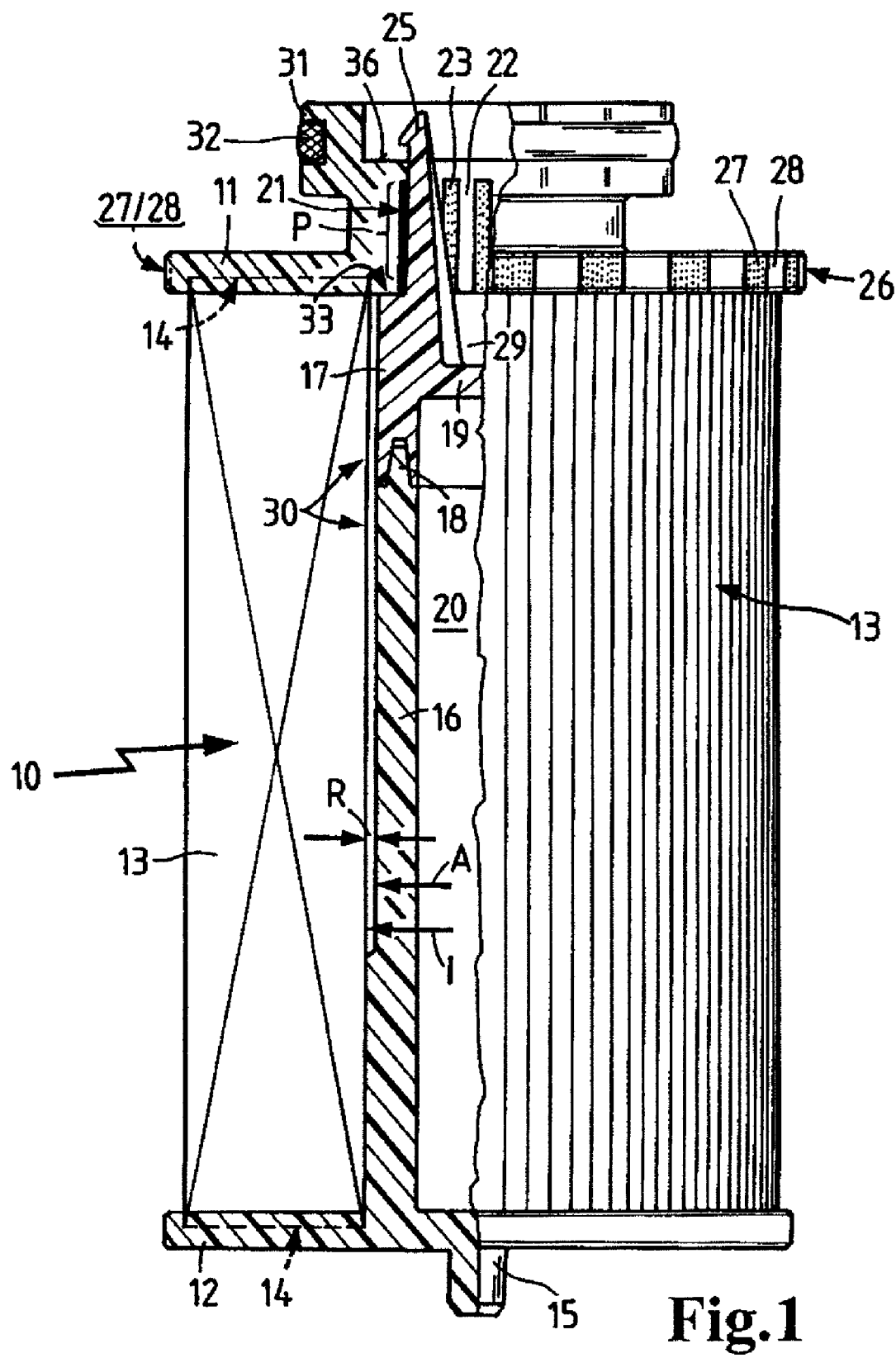
FIG. 1 is a partial sectional view of a filter element according to the invention.

FIG. 1 shows a filter element 10 in a partial sectional view. The filter element 10 has a first end disk 11 and a second end disk 12, where the end disks 11, 12 are made of a thermoplastic material. A pleated filter medium 13 is situated with a seal between the end disks 11 and 12. The filter medium 13 is connected to the end disks 11, 12 by a butt-welding method, thus forming a connection zone 14.

A centering pin 15 is integrally molded on the second end disks 12 and a pipe 16 is also integrally molded on the other side, these parts being made of the same plastic as the second end disk 12. The pipe 16 has an outside diameter "A" which is slightly smaller than an inside diameter I formed by the filter medium 13. The pipe 16 is connected with a seal to a connection 17, the connection being established by a spin welding method. To do so, the pipe 16 has a nose 18 which is partially melted in welding. In addition, parts of the connection 17 which are also made of a thermoplastic material are also melted.

The pipe 16 together with the connection 17 forms a supporting element 30. The connection 17 has the same outside diameter as the pipe 16 in the welding area, so there is no shoulder between the pipe 16 and the connection 17 in the welded state. The connection 17 has a partition 19 which borders a cylindrical dead volume 20 along with the circumference of the connection and the pipe 16. The dead volume 20 is separated with a seal from the annular space R through which the liquid flows between the inside diameter I of the filter medium and the outside diameter A of the pipe 16, thus forming a liquid-tight area in the supporting element 30.

Above the partition 19, there is an anti-rotation element 21 which is formed by the cooperation of the first end disk 11 with the connection 17. To this end, the first end disk 11 has a receptacle area and/or profile area P which is formed by ribs 22 and grooves 23. The connection 17 engages in the grooves 23 with a suitably-shaped profile 24 (according to FIG. 2). In addition, the connection 17 has three snap hooks 25 which are distributed around the circumference and protrude through the profile area P in the first end disk 11 and together with the first end disk 11 form an axial lock.

A passage 29 for the purified liquid is situated inside the axial lock. The first end disk 11 has a profile peripheral face 26 consisting of elevations 27 and recesses 28. In addition a sealing shoulder 31 is integrally molded on the first end disk 11 with a sealing ring 32 provided on it.

Figure 2:
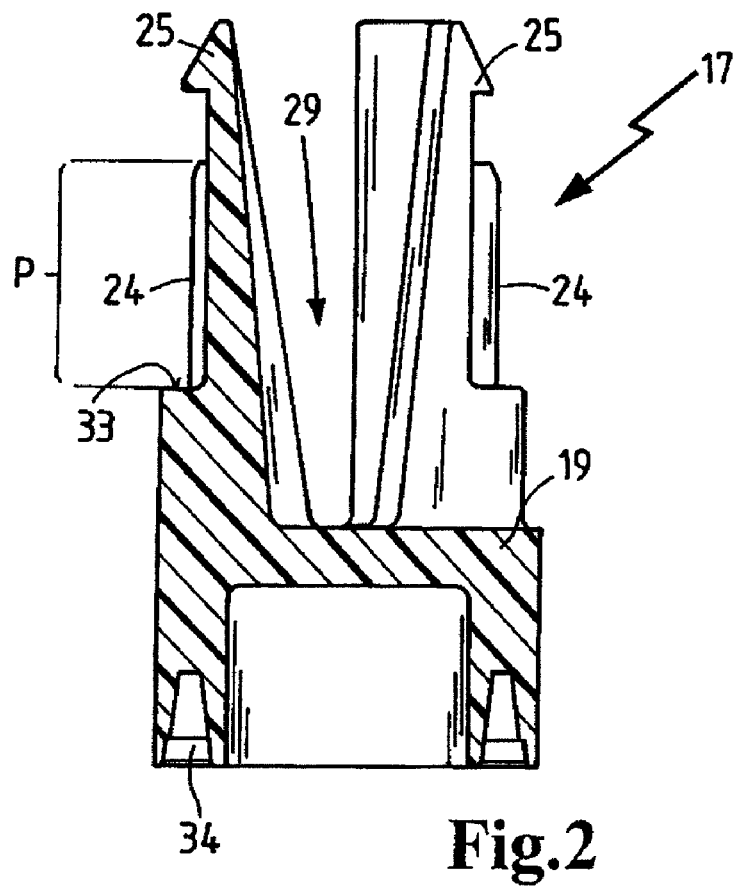
FIG. 2 is a detail view of a connection.

FIG. 2 shows a detail of the connection 17 according to FIG. 1. Components corresponding to those in FIG. 1 are identified by the same reference numerals. Passages 29 for the cleaned liquid are arranged between the three snap hooks 25 distributed around the circumference. The passages 29 extend from the snap hooks 25 to the partition 19.

In addition, the connection 17 has a contact shoulder 33 against which the first end disk 11 comes to rest in the assembled state according to FIG. 1. This contact shoulder 33 also has the passage 29. The cleaned liquid can thus flow out of the interior of the filter element 10. This diagram shows the peripheral annular receptacle 34, with the nose 18 of the pipe 16 according to FIG. 1 engaging in it. The connection 17 thus forms a liquid-permeable area of the supporting element 30.

Figure 3:
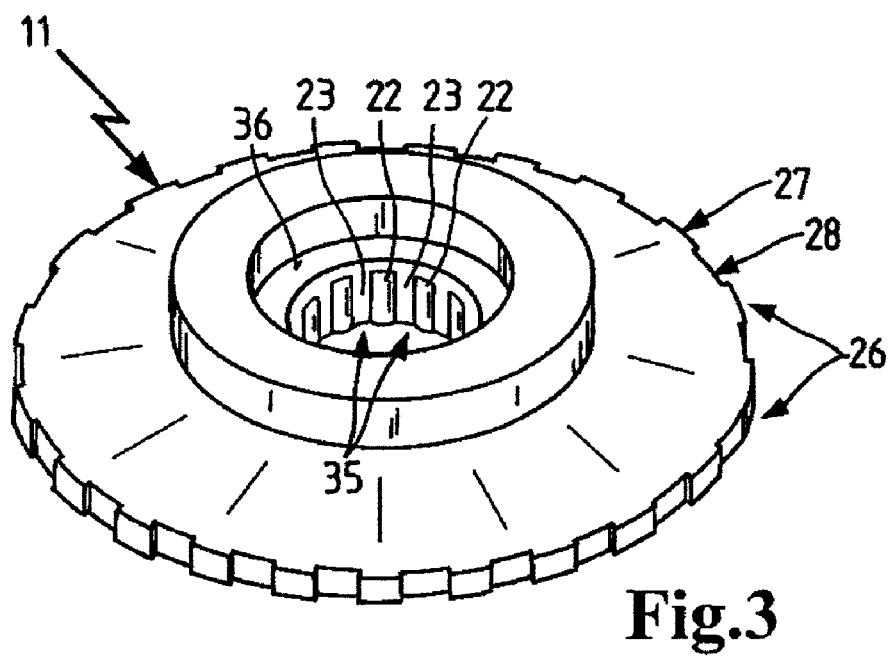
FIG. 3 is a perspective diagram of a first end disk.

FIG. 3 shows the first end disk 11 in a perspective diagram. Again, parts corresponding to those in FIG. 1 are identified by the same reference numerals. The elevations 27 and recesses 28 are arranged in the circumferential area 26. In this illustrative embodiment, numerous elevations 27 and recesses 28 are provided. In other embodiments, fewer elevations 27 and/or recesses 28 may also be provided.

The size ratio between the elevations 27 and the recesses 28 may also vary. The larger the area through which the liquid flows, the lower the flow resistance will be. Since the elevations 27 form the support for the filter element 10 on a housing (not shown), the surface of the elevations must not be too small.

The profile area P has a profile 35 which mates with the profile 24 of the connection 17. In the assembled state, the profile 24 of the connection 17 engages the mating profile 35 of the first end disk 11 which is formed from ribs 22 and grooves 23. In addition, a shoulder 36 is provided on the first end disk 11 with the snap hooks 25 being locked on the shoulder when axial forces try to move the first end disk 11 and the connection 17 away from one another.

Figure 4:
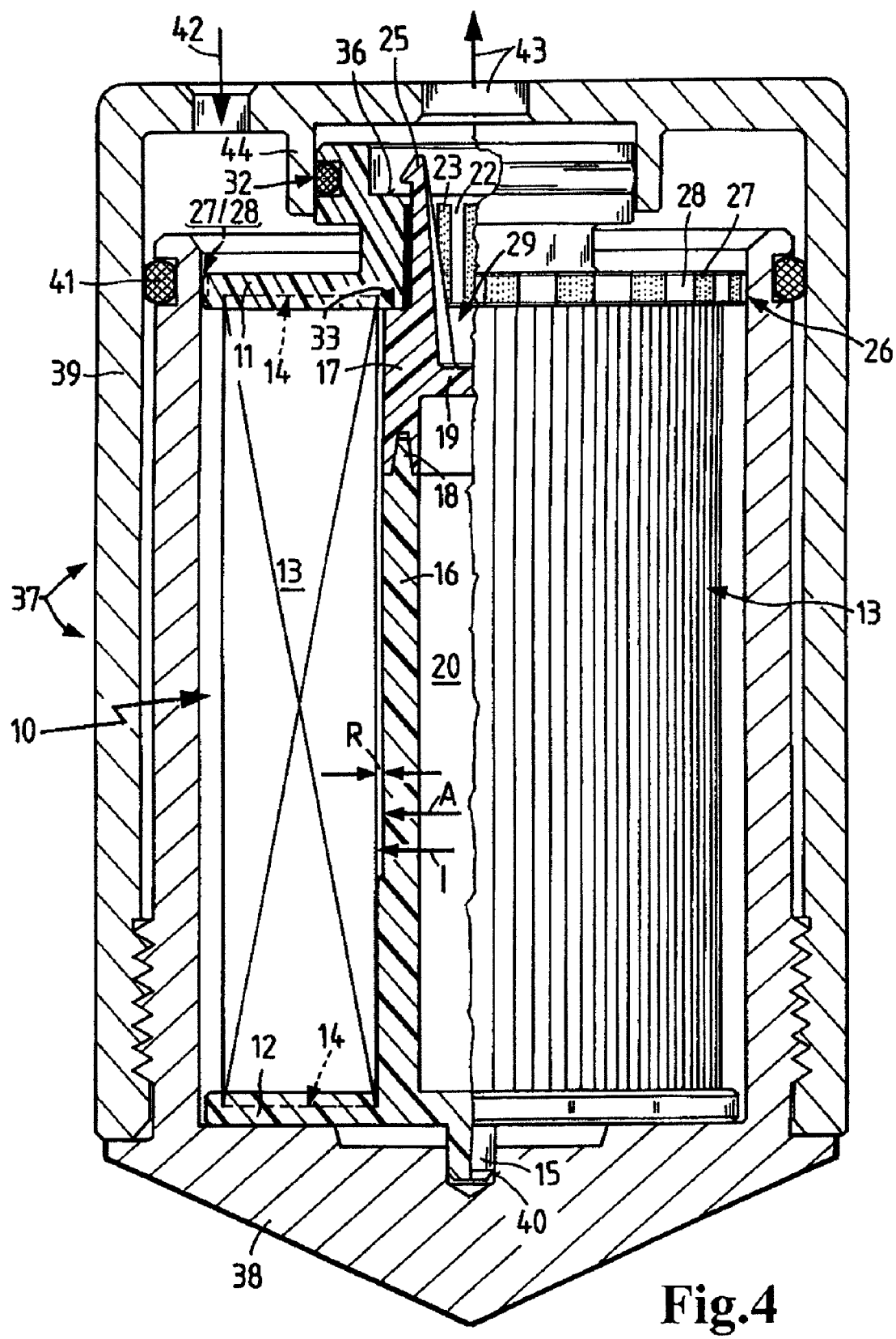
FIG. 4 is a sectional view of a liquid filter.

FIG. 4 shows a sectional view of a liquid filter. The liquid filter has a housing 37 which comprises a housing pot 38 and a housing cover 39. The housing parts 37, 38 are made of metal. The filter element 10 according to FIG. 1 is inserted into the housing pot 38. Once again, parts corresponding to those in FIG. 1 are identified by the same reference numerals.

The centering pin 15 engages in a bore 40 provided for this purpose, thus centering the filter element 10 over the second end disk 12 in the housing pot 38. At the same time, the centering pin 15 acts as a dismantling connection. The elevations 27 on the first end disk 11 also support the filter element 10 on the housing pot 38. The housing cover 39 is bolted to the housing pot 38, so that the housing cover 39 is in the form of a bell.

Between the housing pot 38 and the housing cover 39, a gasket 41 is provided, connecting the housing parts 37, 38 with a seal. An inlet 42 and an outlet 43 are arranged in the housing cover. A sealing shoulder 44 is integrally molded on the housing cover 39, so that the inlet 42 will be separated from the outlet 43 with a seal. The gasket 32 is in contact with the sealing shoulder 44.

The liquid to be cleaned flows through the inlet 42 into the housing 37 of the liquid filter. Between the wall of the housing pot 38 and the recesses 28 in the first end disk 11, the liquid flows toward the filter medium 13. Impurities present in the liquid are accumulated by the filter medium 13. The purified liquid flows into the annular space R which forms the clean side of the filter element 10. The passages 29 connect the annular space R to the outlet 43, so that the liquid flows this distance to leave the housing 37.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for filtering a freeze-endangered liquid comprising:
   first and second end disks,
   an inlet and an outlet at said first end disk with a seal separating said inlet and outlet,
   a filter medium situated between the end disks, said filter medium being closed in the form of a ring and surrounding an annular space, and
   a supporting element which is slightly smaller than the annular space and which is situated inside said annular space, said supporting element being connected to the second end disk and having an anti-rotation element which engages in a receptacle area on the first end disk,
   wherein the supporting element is provided with an axial lock which is operatively connected to the first end disk.

2. A filter element according to claim 1, wherein the axial lock is a snap connection which connects the supporting element and the first end disk.

3. A filter element according to claim 1, wherein the supporting element comprises two parts inseparably joined together, and the axial lock is provided on one of said two parts.

4. A filter element according to claim 1, wherein the supporting element comprises a liquid-tight area and a liquid-permeable area, and a seal is provided which separates the liquid-tight area from the liquid-permeable area.

5. A filter element according to claim 4, wherein the liquid-permeable area is situated at least partially in the anti-rotation element.

6. A filter element according to claim 1, wherein the first end disk has a profiled peripheral surface providing said inlet.

7. A filter element according to claim 6, wherein said profiled peripheral surface comprises a plurality of recesses, and wherein said seal is provided on a sealing shoulder of said first end disk.

8. A filter element according to claim 1, wherein at least one part of the supporting element is integrally molded on the second end disk.

9. A liquid filter for a freeze-endangered liquid, said filter comprising a filter element according to claim 1 and a housing; said housing comprising a housing pot and a housing cover, said housing pot having an inside volume which is slightly larger than the filter element, and said filter element being disposed in said housing such that the inlet is separated from the outlet by a seal.

10. A liquid filter according to claim 9, wherein said freeze-endangered liquid is a urea-water solution.

11. A method for producing a filter element according to claim 1, said method comprising the steps of:
   attaching the second end disk to the filter medium;
   securing the anti-rotation element of the supporting element in the first end disk,
   attaching the first end disk to the filter medium, and
   connecting the axial lock of the supporting element to the first end disk.

* * * * *